(12) United States Patent
Hayato

(10) Patent No.: US 6,175,721 B1
(45) Date of Patent: *Jan. 16, 2001

(54) COMMUNICATION DEVICE HAVING INCOMING INDICATORS

(75) Inventor: Yasuo Hayato, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/671,348

(22) Filed: Jun. 27, 1996

(30) Foreign Application Priority Data

Jun. 30, 1995 (JP) .................................................. 7-188471

(51) Int. Cl.⁷ ...................................................... H04Q 3/02

(52) U.S. Cl. ...................................... 455/38.2; 340/825.44

(58) Field of Search .................................. 455/38.1, 38.2, 455/38.4, 38.5, 566, 567; 340/825.44, 825.45, 825.46, 825.48

(56) References Cited

U.S. PATENT DOCUMENTS

| | | | | |
|---|---|---|---|---|
| 4,419,668 | * | 12/1983 | Ganucheau | 340/825.44 |
| 4,872,005 | * | 10/1989 | DeLuca et al. | 340/825.44 |
| 4,894,649 | * | 1/1990 | Davis | 340/825.44 |
| 4,918,438 | | 4/1990 | Yamasaki . | |
| 5,128,981 | * | 7/1992 | Tsukamoto et al. | 455/567 |
| 5,463,368 | * | 10/1995 | Tsunoda et al. | 340/825.44 |

FOREIGN PATENT DOCUMENTS

| | | |
|---|---|---|
| 61-175033 | 7/1987 | (JP) . |
| 4-033426 | 2/1992 | (JP) . |

* cited by examiner

Primary Examiner—Lee Nguyen
(74) Attorney, Agent, or Firm—Jay H. Maioli

(57) ABSTRACT

A receiver which reduces the inconvenience resulting from a user forgetting to switch notification modes includes notice means with a plurality of modes for notifying the user of to notify a call, a clock for counting time, information input means entering to input set information by the user, and control means for switching the notice means in accordance with the set information by the user when the clock indicates that the time set by the user has arrived. The user is notified of the call with the notice means which is switched by the control means.

9 Claims, 2 Drawing Sheets

COMMUNICATION DEVICE HAVING INCOMING INDICATORS

BACKGROUND OF THE INVENTION

1. Field of the Invention

This invention relates to a receiver and, more particularly, is applicable to a receiving terminal apparatus of a radio paging system.

2. Description of the Related Art

Heretofore, a radio paging system has been provided as a paging system calling up the owner of a receiving terminal apparatus. In the paging system, when calling a receiving terminal apparatus, the sender first dial-inputs the terminal numbers of the receiving terminal apparatus that the sender would like to call from a predetermined telephone, thereafter, dial-inputs information, a message or the like. These information are transmitted to the central base station on the enterprise side via a general telephone network. The central base station receiving those gives adjacent base stations instructions to call the receiving terminal apparatus. The adjacent base station receiving this instruction transmits a call signal and the message, for instance, by using an electric wave of the VHF band, to call the receiving terminal apparatus. The receiving terminal apparatus receiving this call signal notifies a callee that a call has been received and displays the received information, the message or a like, on the liquid crystal display. Thereby, the owner of the receiving terminal apparatus is notified that he has been called up and can see the information from the sender, of the message or the like.

By the way, when the receiving terminal apparatus notifies the callee that a call has received, generally, a call sound is generated to notify a call to the callee (sound mode). In addition, recently the function of a vibrator has been used to notify the callee of using vibrations a call (vibrator mode) when making a call sound in a meeting or the like, is unpreferable since it disturbs other persons. These modes can be switched with a mode switch, thus the owner can select either one in accordance with the particular situation.

However, in the receiving terminal apparatus as the above, the to switch between two modes is performed with the mode switch being a hand switch, thus if the owner has forgotten switching the mode, it arises that a call sound is made in an unpreferable state or no sound is made when sound desired. For instance, in the case where the owner has put down the receiving terminal apparatus when he goes home, if he has forgotten to switch the mode from the vibrator mode to the sound mode, it arises that the user does not notice a call even if the vibrator has operated to notify of the call.

SUMMARY OF THE INVENTION

The objects of the invention have been achieved by the provision of a receiver having: plural notice means to notify a call to a user; a clock for counting time; and information input means to input set information by the user. When the receiver understands that the time set by the user has elapsed according to the clock, the receiver switches the plural notice means in accordance with the set information input by the user, and notifies the user that the user has been called up. Thereby, inconvenience caused by forgetting to switch the notice means by the user, as with prior art devices, can be reduced.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
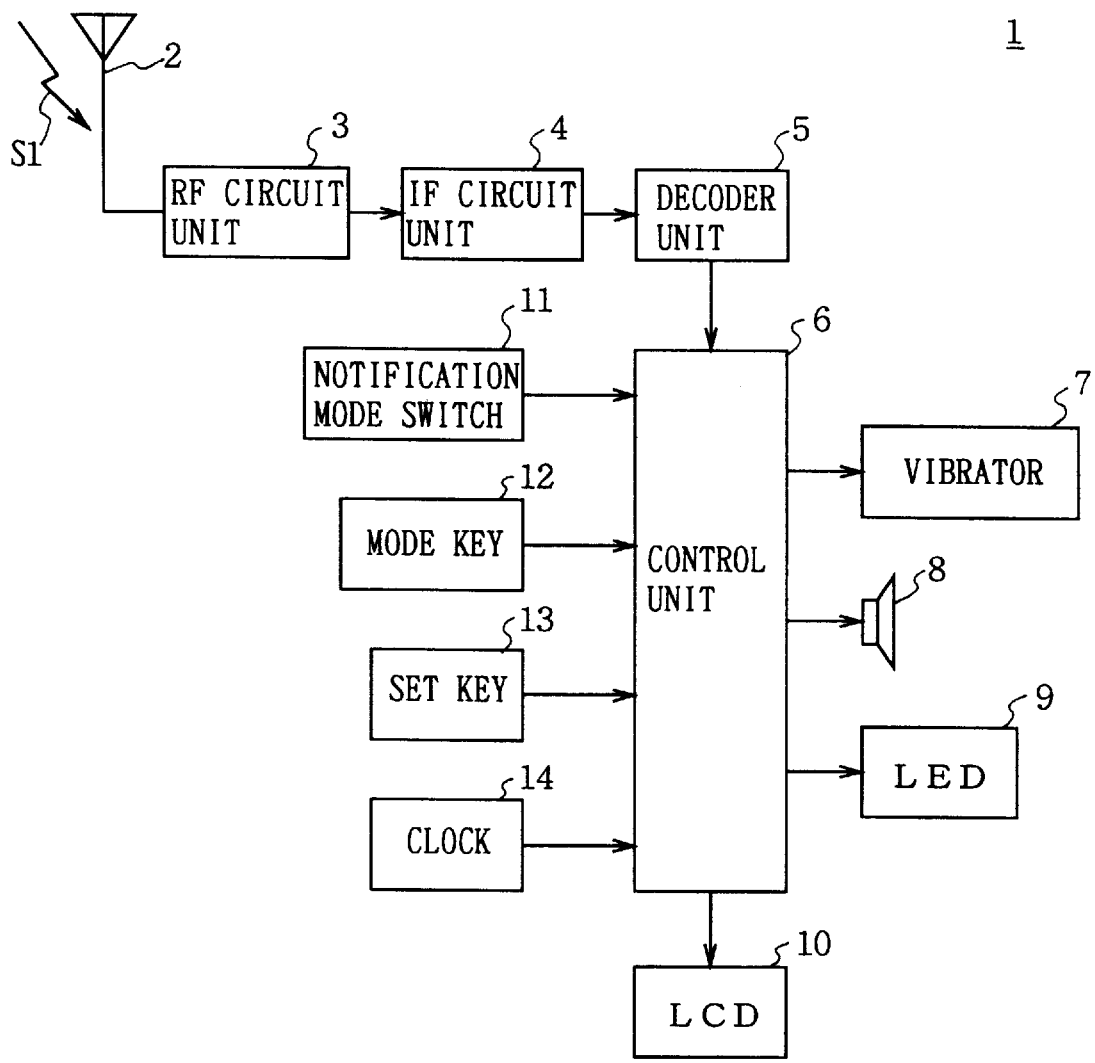
FIG. 1 is a block diagram showing the structure of the receiving terminal apparatus of a paging system according to one embodiment of the present invention.

Preferred embodiments of this invention will be described with reference to the accompanying drawings;

FIG. 1 shows a receiving terminal apparatus 1 of the paging system applied the present invention. A call control signal Si transmitted from a predetermined base station is received by an antenna 2 and supplied to a radio frequency (RF) circuit unit 3. The RF circuit unit 3 amplifies the received call control signal S1 and then performs frequency conversion on the signal S1 to generate an intermediate frequency signal S2. An intermediate frequency (IF) circuit unit 4 amplifies the intermediate frequency signal S2 and then performs a prescribed signal processing on the signal S2 to produce a digital signal S3. Then, the digital signal S3 transmitted by the base station is demodulated. A decoder unit 5 performs error correction or the like.to the digital signal S3 to restore the call signal or message transmitted by the base station and supplies it to a control unit 6.

The control unit 6 is formed by, for example, a central processing unit (CPU). The control unit 6 detects that its own station has received a call from the call signal and drives a vibrator 7, a buzzer 8, or a call lamp (LED) 9 in order to notify the call to the user. The received message is displayed on a liquid crystal display (LCD) 10. Thereby, the user is notified that he has been called up and can see the message from the sender.

By the way, in the receiving terminal apparatus 1, the vibrator 7, the buzzer 8, and the call lamp 9 are provided as notice means to notify the user of the call, and they are arbitrarily switched between them in accordance with the setting by the user. That is, when the vibrator 7 is set as the notice means (i.e., in the vibrator mode), the control unit 6 drives the motor of the vibrator 7 to generate the vibration, and notifies the call to the user with the vibration. When the buzzer 8 is set as the notice means (i.e., in the sound mode), the control unit 6 drives the buzzer 8 to make a call sound and turns on and off the call lamp 9 in order to notify the user of the call with the call sound and the light. On the other hand, when the call lamp 9 is set as the notice means (i.e., in the lamp mode), the control unit 6 turns on and off only the call lamp 9 without driving the vibrator 7 or the user of the buzzer 8 to notify the call only with the light.

The switching of the notice means is set by a notification mode switch 11. The notification mode switch 11 has three kinds of switches: "vibrator mode", "sound mode", and "lamp mode". The user is notified with one of the above modes in accordance with the switching of the notice means.

The, the switching of the notice means is also set by the timer setting to the control unit 6. That is, for instance, even if it is set to the "vibrator mode" by the notification mode switch 11, in the case where it is set to the "sound mode", for example, from 6:30 p.m. till 9:30 a.m., by the timer, it is automatically switched to that sound mode at the time, thus the call is notified to a user by the call sound during that time.

Figure 2A:
FIG. 2 is a schematic diagram showing a display in the timer setting of the receiving terminal apparatus.

Hereinafter, it will be described a method of mode switching by the timer. When performing timer setting, the mode key 12 is pushed. At this time, each setting mode (for example, time setting mode, timer setting mode, or the like) is sequentially displayed on the liquid crystal display 10 every time the mode key 12 is pushed. When "timer set" is displayed by this operation as shown in FIG. 2A, the set key 13 is pushed to enter the timer setting mode.

Figure 2B:

After entering the timer setting mode, a set time is displayed as shown in FIG. 2B. In this state, the cursor is on the figure of "hour" of the starting time, which is turned on and off. By pushing the mode key 12 in this state, the figure of "hour" is sequentially updated. When the numeral which is desired to be set is displayed, the set key 13 is pushed.

Figure 2C:

The figure of "hour" is decided by this operation and the cursor is moved to the second figure of "minute" as shown in FIG. 2C. By pushing the mode key 12 in this state, the second figure of "minute" is sequentially updated. When the numeral which is desired to be set is displayed, the set key 13 is pushed.

Figure 2D:

The second figure of "minute" is decided by this operation and the cursor is moved to the first figure of "minute" as shown in FIG. 2D. By pushing the mode key 12 in this state, the first figure of "minute" is sequentially updated. When the numeral which is desired to be set is displayed, the set key 13 is pushed.

Figure 2E:

The first figure of "minute" is decided by this operation and the cursor is moved to the figure of "hour" of the end time as shown in FIG. 2E. Hereinafter, similar to the above operation, the mode key 12 is pushed to display the numeral which is desired to be set, and when the numeral has been displayed, the set key 13 is pushed to set the end time.

Figure 2F:
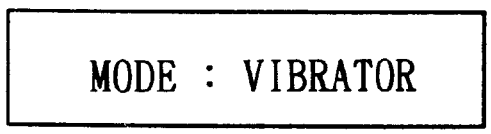
Figure 2G:
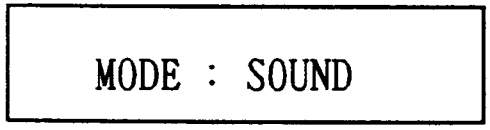
Figure 2H:
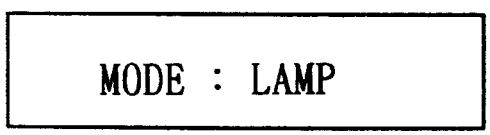

After finishing the setting of the end time, each notification mode is displayed on the liquid crystal display 10 every time the mode key 12 is pushed, as shown in FIGS. 2F to 2H. When the notification mode which is desired to be set is displayed by this operation, push the set key 13 is pushed. Thereby, the notification mode desired by the user is set for the time set by the above operations.

In the above setting, assuming that "sound mode" has been set from 6:30 p.m. till 9:30 a.m., the control unit 6 knows the time with the clock 14 counting time. This time, for an incoming call, "sound mode" has priority over "vibrator mode" even if the notification mode switch 11 has been set to "vibrator mode", and thus the control unit 6 makes a call sound by driving the buzzer 8 in order to notify the user of the call, that is, to notify the call not by "vibrator mode", but by "sound mode".

In the above structure, in the receiving terminal apparatus 1 of this embodiment, the notification mode notifying a call to the user can be set by the timer setting of the control unit 6 in addition to the hand setting by the notification mode switch 11. Thereby, the control unit 6 automatically switches the notification mode even in the case where the user has forgotten to switch the notification mode switch 11. As a result, the annoyance of having call sound made at an undesireable time or no sound made when desired, resulting form a failure to switch can be reduced, thus its usability can be improved over the prior art.

As the above, an arrangement in which the notification mode can be switched by the timer setting, is specially effective for people having a constant schedule, for instance, meetings are concentrated in the mornings, or it is always a private time after 8 p.m., that is, who usually use this apparatus in the same way to because the trouble of switching the notification mode switch 11 can be eliminated.

According to the above structure, providing the control unit 6 which automatically switches the notification mode at the time set by the user, can reduce inconvenience in forgetting to switch the notification mode, thereby, its usability can be improved over the prior art.

In the aforementioned embodiment, it has been described in the case where time is set using the timer setting. However, the present invention is not limited to such a case but also encompasses setting of day of the week, month, or date. In this case, the aforementioned mode is switched in accordance with a determined day of the week, month, or date.

Further, in the aforementioned embodiment, it has been described the case where the setting with the notification mode switch 11 and the timer setting by the control unit 6 are performed at the same time. However, the present invention is not limited to such a case but encompasses the notification mode having switched only by the timer setting.

Further, in the aforementioned embodiments, it has been described the case where the call sound is generated by the buzzer 8. However, the present invention is not limited to such a case but also encompasses the call sound generated by a speaker. That is, other sound generating means, which generates a sound notifying a call, can be used instead of that.

Furthermore, in the aforementioned embodiments, it has been described the case where the LED is used as the call lamp 9. Merely, the present invention is not limited to such a case but also encompasses other light generating means, which generates a light notifying of a call, can be used.

Also, in the aforementioned embodiments, it has been described the case where the timer setting simply has priority to the setting made with the notification mode switch 11. The present invention is not limited to this but also encompasses, for instance, a switching feature called "timer priority" provided in the notification mode switch, wherein the timer setting has priority to the setting made with the notification mode switch 11 when the notification mode switch has been set to "timer priority".

Furthermore, in the aforementioned embodiments, it has been described the case where the notification mode is simply switched in accordance with the timer setting. However, the present invention is not limited to this but also encompasses control over the volume and the tone of the buzzer 8, the way of turning on and off of the call lamp 9 all of which can be changed by the timer setting.

Further, in the aforementioned embodiments, it has been described the case where the present invention is applied to the receiving terminal apparatus 1 of the paging system. However, the present invention is not limited to this but also can be applied to, for example, a kind of portable telephone. That is, the present invention is widely applicable to a receiver in which a call signal transmitted from a predetermined base station and which notifies a user of the call.

While there has been described preferred embodiments of the invention, it will be obvious to those skilled in the art that various changes and modifications may be achieved without departing from the true spirit and scope of the invention.

What is claimed is:

1. A receiver comprising:

receiving means for receiving a transmitted signal;

a plurality of notice means each for notifying a user of said transmitted signal received by said receiving means by a different sensorily perceived notification;

a clock for continuously keeping track of time on daily basis and for having start and end times set by the user;

input means for setting a time range defined by the start and end times to be detected by said clock, wherein said input means includes a set switch whereby the user sets one of said plurality of notice means to be utilized during said time range; and control means connected to said plurality of notice means and said clock for switching to said one of said plurality of notice means when a current time is in said time range of said clock set by said input means.

2. The receiver according to claim 1, wherein said plurality of notice means includes sound generating means for generating a sound, and vibration generating means for generating a vibration.

3. The receiver according to claim 2, wherein said control means adjusts a volume of said sound generated by said sound generating means based on said time range set by said input means.

4. The receiver according to claim 2, wherein said control means adjusts a tone of said sound generated by said sound generating means based on said time range set by said input means.

5. The receiver according to claim 1, wherein said plurality of notice means includes sound generating means for generating a sound, and light generating means for generating a visible light.

6. The receiver according to claim 5, wherein said control means adjusts a volume of said sound generated by said sound generating means based on said time range set by said input means.

7. The receiver according to claim 5, wherein said control means adjusts a tone of said sound generated by the sound generating means based on said time range set by said input means.

8. The receiver according to claim 1, wherein said plurality of notice means includes light generating means for generating a visible light, and vibration generating means for generating a vibration.

9. The receiver according to claim 1, wherein said plurality of notice means includes sound generating means for generating a sound, light generating means for generating a visible light, and vibration generating means for generating a vibration.

* * * * *